United States Patent [19]
Wimmer

[11] 4,146,005
[45] Mar. 27, 1979

[54] METHOD OF OPERATING A SPARK IGNITION ENGINE

[75] Inventor: Donn B. Wimmer, Bartlesville, Okla.

[73] Assignee: Phillips Petroleum Company, Bartlesville, Okla.

[21] Appl. No.: 715,369

[22] Filed: Aug. 18, 1976

[51] Int. Cl.² ............................................. F02B 23/00
[52] U.S. Cl. ............................ 123/191 S; 123/75 B; 123/191 SP
[58] Field of Search ............ 123/32 SP, 32 ST, 33 D, 123/75 B, 191 S, 191 SP

[56] References Cited

U.S. PATENT DOCUMENTS

| | | | |
|---|---|---|---|
| 2,758,576 | 8/1956 | Schlamann | 123/32 ST |
| 2,763,248 | 9/1956 | Green et al. | 123/65 |
| 2,826,187 | 3/1958 | Meyer | 123/191 |
| 2,983,268 | 5/1961 | Heintz | 123/191 |
| 3,066,661 | 12/1962 | May | 123/143 |
| 3,066,662 | 12/1962 | May et al. | 123/143 |
| 3,154,058 | 10/1964 | Warren | 123/32 |
| 3,317,773 | 5/1967 | Inove | 123/75 B |
| 3,406,667 | 10/1968 | Evans et al. | 123/32 SP |
| 3,776,212 | 12/1973 | Karlowitz | 123/32 ST |
| 3,777,724 | 12/1973 | Kiley | 123/191 S |
| 3,809,039 | 5/1974 | Alquist | 123/32 ST |
| 3,830,205 | 8/1974 | Date et al. | 123/32 ST |
| 3,844,259 | 10/1974 | Asaka | 123/32 ST |
| 3,890,942 | 6/1975 | Date et al. | 123/32 SP |
| 4,029,075 | 6/1977 | Noyuchi et al. | 123/75 B |

OTHER PUBLICATIONS

"An Evaluation of the Performance and Emissions of a CFR Engine Equipped with a Prechamber," Wimmen et al. 5/73 SAE.
Combustion Sci. & Tech., 1972, vol. 6, pp. 191-201, Breisacher et al.

*Primary Examiner*—Charles T. Jordan
*Assistant Examiner*—S. A. Cangialosi

[57] ABSTRACT

A method of operating a spark ignition internal combustion engine having a main combustion chamber into which there is introduced a fuel-lean mixture of fuel and air, an auxiliary combustion chamber into which there is introduced a fuel-rich mixture of fuel and air, and an ignition means located in said auxiliary combustion chamber. In said method the engine is operated to approach an extended minimum lean misfire limit, and thus obtain minimum emissions of objectionable pollutants, e.g., nitrogen oxides. Said method comprises providing the engine with an auxiliary combustion chamber having a predetermined length over diameter (L/D) ratio and then operating the engine at certain predetermined values for the interacting parameters of spark gap location, volume percent of auxiliary chamber filled with said fuel-rich mixture, and percent of stoichiometric fuel in said fuel-rich mixture; with said predetermined values for said parameters having been predetermined relative to said L/D ratio.

16 Claims, 8 Drawing Figures

AUXILIARY CHAMBER DESIGN CHARACTERISTICS

| AUXILIARY CHAMBER NUMBER | VOL (IN³) | A (IN.) | B (IN.) | C (IN.) | E (IN.) | F (IN.) | L (IN.) | F/E | L/D* | D* |
|---|---|---|---|---|---|---|---|---|---|---|
| 1-A | 0.85 | 0.50 | 0.75 | 0.63 | 2.38 | 0.12 | 2.50 | 0.05 | 3.80 | 0.66 |
| 1-B | ↓ | ↓ | ↓ | ↓ | 1.59 | 0.91 | ↓ | 0.57 | ↓ | ↓ |
| 1-C | ↓ | ↓ | ↓ | ↓ | 1.21 | 1.29 | ↓ | 1.07 | ↓ | ↓ |
| 2 | 0.61 | 0.50 | 0.50 | 0.0 | 1.75 | 1.50 | 3.25 | 0.86 | 6.63 | 0.49 |
| 3-A | 1.35 | 0.50 | 0.75 | 1.44 | 2.65 | 1.18 | 3.83 | 0.45 | 5.72 | 0.67 |
| 3-B | ↓ | ↓ | ↓ | ↓ | 2.42 | 1.41 | ↓ | 0.58 | ↓ | ↓ |
| 3-C | ↓ | ↓ | ↓ | ↓ | 2.20 | 1.63 | ↓ | 0.74 | ↓ | ↓ |
| 4-A | 1.88 | 0.50 | 0.75 | 1.44 | 3.62 | 1.40 | 5.02 | 0.39 | 7.28 | 0.69 |
| 4-B | ↓ | ↓ | ↓ | ↓ | 2.42 | 2.60 | ↓ | 1.07 | ↓ | ↓ |
| 5-A | 2.40 | 0.50 | 0.75 | 1.44 | 4.80 | 1.42 | 6.22 | 0.30 | 8.89 | 0.70 |
| 5-B | ↓ | ↓ | ↓ | ↓ | 3.61 | 2.61 | ↓ | 0.72 | ↓ | ↓ |
| 5-C | ↓ | ↓ | ↓ | ↓ | 2.43 | 3.79 | ↓ | 1.56 | ↓ | ↓ |

*MEAN DIAMETER (IN.) – DEFINED AS THE DIAMETER OF A CYLINDER HAVING THE SAME GIVEN VOLUME AND SAME GIVEN LENGTH.

ARRANGEMENT OF AUXILIARY AND MAIN COMBUSTION CHAMBERS (TOP VIEW)

AUXILIARY CHAMBER DESIGN CHARACTERISTICS

| AUXILIARY CHAMBER NUMBER | VOL (IN³) | A (IN.) | B (IN.) | C (IN.) | E (IN.) | F (IN.) | L (IN.) | F/E | L/D* | D* |
|---|---|---|---|---|---|---|---|---|---|---|
| 1-A | 0.85 | 0.50 | 0.75 | 0.63 | 2.38 | 0.12 | 2.50 | 0.05 | 3.80 | 0.66 |
| 1-B | ↓ | ↓ | ↓ | ↓ | 1.59 | 0.91 | ↓ | 0.57 | ↓ | ↓ |
| 1-C | | | | | 1.21 | 1.29 | | 1.07 | | |
| 2 | 0.61 | 0.50 | 0.50 | 0.0 | 1.75 | 1.50 | 3.25 | 0.86 | 6.63 | 0.49 |
| 3-A | 1.35 | 0.50 | 0.75 | 1.44 | 2.65 | 1.18 | 3.83 | 0.45 | 5.72 | 0.67 |
| 3-B | | | | | 2.42 | 1.41 | | 0.58 | | |
| 3-C | ↓ | ↓ | ↓ | ↓ | 2.20 | 1.63 | ↓ | 0.74 | ↓ | ↓ |
| 4-A | 1.88 | 0.50 | 0.75 | 1.44 | 3.62 | 1.40 | 5.02 | 0.39 | 7.28 | 0.69 |
| 4-B | ↓ | ↓ | ↓ | ↓ | 2.42 | 2.60 | ↓ | 1.07 | ↓ | ↓ |
| 5-A | 2.40 | 0.50 | 0.75 | 1.44 | 4.80 | 1.42 | 6.22 | 0.30 | 8.89 | 0.70 |
| 5-B | | | | | 3.61 | 2.61 | | 0.72 | | |
| 5-C | ↓ | ↓ | ↓ | ↓ | 2.43 | 3.79 | ↓ | 1.56 | ↓ | ↓ |

*MEAN DIAMETER (IN.) — DEFINED AS THE DIAMETER OF A CYLINDER HAVING THE SAME GIVEN VOLUME AND SAME GIVEN LENGTH.

METHOD OF OPERATING A SPARK IGNITION ENGINE

This invention relates to a method of operating a spark ignition engine so as to obtain low emissions of pollutants, e.g., nitrogen oxides ($NO_x$), carbon monoxide (CO), and unburned hydrocarbons (HC). Of said pollutants, the $NO_x$ is usually the most difficult to control. More particularly, the invention relates to a method of operating a spark ignition internal combustion engine having a main combustion chamber which in operation is supplied with a fuel-lean combustible mixture of fuel and air, and an auxiliary combustion chamber which in operation is supplied with a fuel-rich combustible mixture of fuel and air. A spark ignition means is provided in the auxiliary chamber for igniting said fuel-rich mixture at an initial ignition point, and the resulting flame fires through an orifice connecting said chambers and ignites the fuel-lean mixture in the main combustion chamber.

It is known that in the operation of spark ignition engines, in general, the lower the lean limit of operation (the lean misfire limit), the lower the emissions of said pollutants will be. It is also known that spark ignition engines provided with auxiliary combustion chambers, as described above, are capable of being operated with lower lean misfire limits, and thus produce lower emissions of said pollutants, than are like or similar engines which are not provided with auxiliary combustion chambers. For example, see U.S. Pat. No. 3,809,039 issued May 7, 1974 in the name of H. E. Alquist.

However, there have been problems associated with the design and operation of auxiliary chambered engines. These problems have centered largely in the design and operation of the auxiliary chamber. Some investigators have indicated that the volume of the auxiliary combustion chamber relative to the volume of the main combustion chamber is critical. For example, see U.S. Pat. No. 3,830,205 issued Aug. 20, 1974 in the names of Date et al. Other investigators have indicated that the size and shape of the orifice providing communication between the auxiliary combustion chamber and the main combustion chamber is critical. For example, see U.S. Pat. No. 3,406,667 issued Oct. 22, 1968 in the names of Evans et al. Still other problems and solutions therefor have been proposed by other investigators.

The present invention provides a solution for the above described problems. Based on the investigation set forth hereinafter it has now been concluded that the volume, per se, of the auxiliary combustion chamber relative to the volume, per se, of the main combustion chamber, and also the size and shape of the orifice connecting said combustion chambers, are less important variables when compared to the importance of the interacting variables described herein and comprising the subject matter of this invention.

It has now been discovered that the length over diameter (L/D) ratio of the auxiliary combustion chamber is an important variable when it is desired to extend the minimum lean misfire limit (LMFL) of an auxiliary chambered engine. It has been further discovered that the LMFL actually obtained at any given L/D ratio for the auxiliary combustion chamber, be it the minimum value or a greater value, is a complex function of: (1) the location of the spark ignition means (initial ignition point) in the auxiliary combustion chamber; (2) the volume percent of the auxiliary combustion chamber filled with the fuel-rich mixture during the intake stroke of the engine; and (3) the fuel content, percent of stoichiometric, of the fuel-rich mixture introduced into the auxiliary combustion chamber. All four of said variables should be taken into consideration to assure successful operation of auxiliary chambered engines so as to approach the minimum LMFL and obtain maximum permissible reduction of pollutant emissions in the engine exhaust.

Thus, according to the invention, there is provided a method for operating an internal combustion spark ignition engine comprising at least one cylinder and a reciprocating piston therein defining a main combustion chamber, an auxiliary combustion chamber associated with said main combustion chamber, an orifice providing communication between said main combustion chamber and said auxiliary combustion chamber, and spark ignition means for causing ignition of a fuel-air mixture in said auxiliary combustion chamber, said method comprising: providing said main combustion chamber with an auxiliary combustion chamber having a predetermined length over diameter ratio within the range of from 1 to about 9; introducing a fuel-rich mixture of fuel and air having a fuel content of at least about 200 percent of stoichiometric into said auxiliary combustion chamber in an amount which is at least about 125 volume percent of the volume of said auxiliary combustion chamber, with said fuel content and said amount of said mixture both being predetermined relative to said length over diameter ratio; introducing a fuel-lean mixture of fuel and air into said main combustion chamber; and igniting said fuel-rich mixture at an initial ignition point located in the rearward 50 percent of said auxiliary combustion chamber, measured from said orifice and predetermined relative to said length over diameter ratio, for causing ignition of said fuel-lean mixture in said main combustion chamber via said orifice.

FIGS. 5, 6, 7, and 8 illustrate certain results of the test runs described herein.

Figure 1:
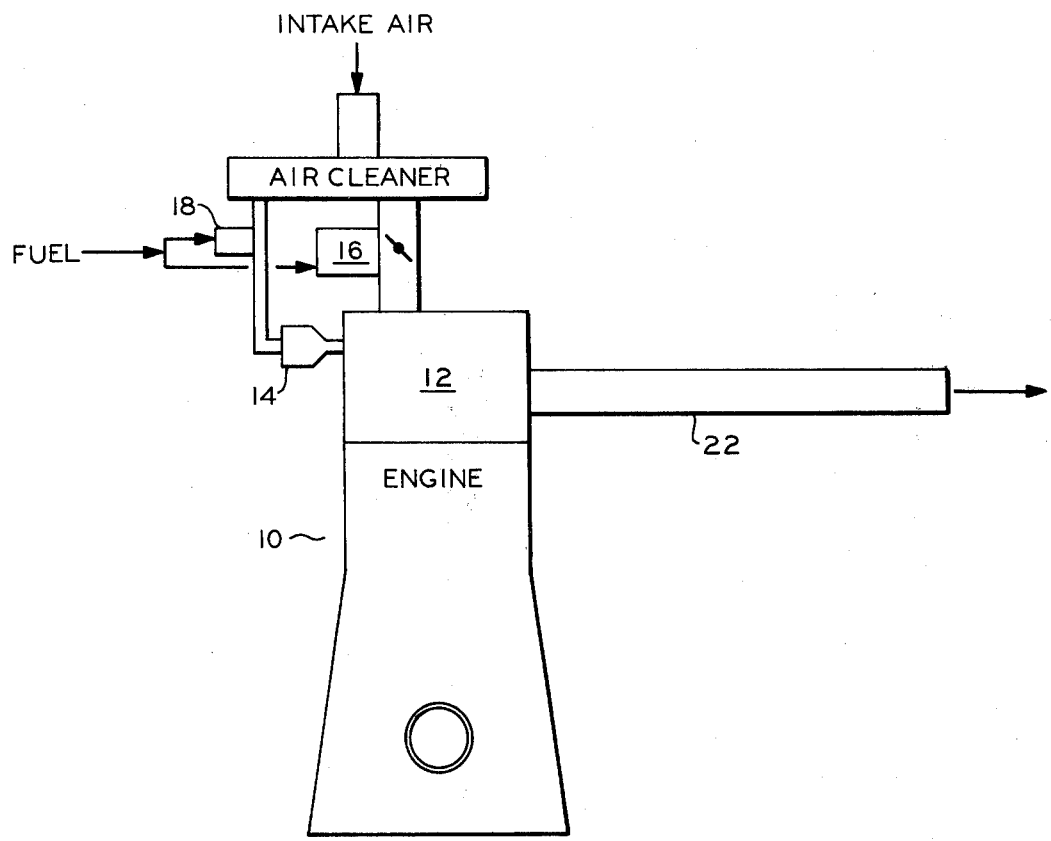
FIG. 1 is a diagrammatic representation of a spark ignition engine of the type employed in the test runs described herein.
Figure 2:
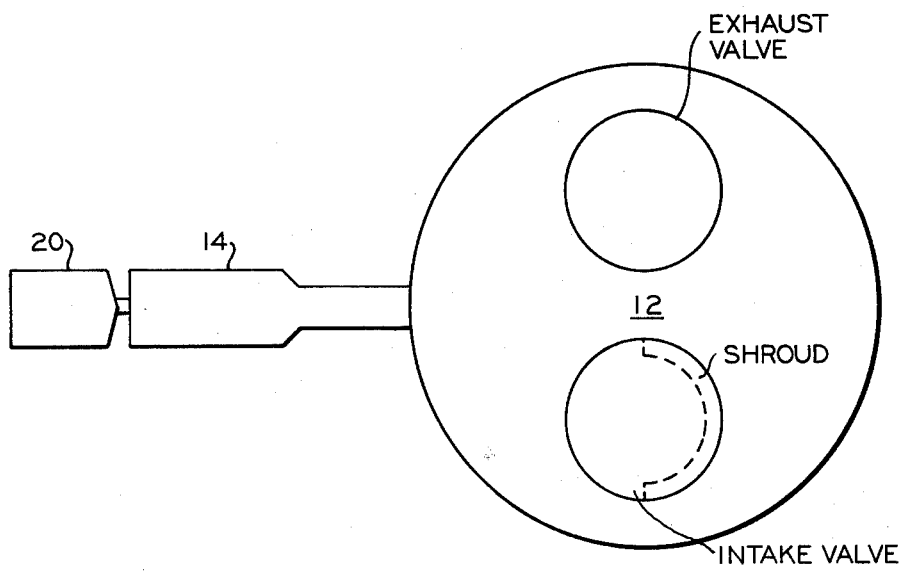
FIG. 2 is a diagrammatic top plan view of the engine of FIG. 1, showing the arrangement of the auxiliary and the main combustion chambers of said engine.

Referring now to FIGS. 1 and 2, there is illustrated an internal combustion spark ignition engine 10 having a main combustion chamber 12 and an auxiliary combustion chamber 14 which are in fluid communication with each other. For simplicity, reference will be made herein to the main combustion chamber and the auxiliary combustion chamber in the singular. However, it should be understood that the engine can have a plurality of main combustion chambers, preferably with each of said main combustion chambers having an auxiliary combustion chamber associated therewith as set forth herein with reference to the singular chambers. The volume of the auxiliary combustion chamber will usually be in the order of 2 to 3 percent of the displacement of the main combustion chamber with which it is associated. The volumes of the auxiliary chambers studied in the test runs described hereinafter ranged from 1.6 to 6.4 percent of the displacement of the main combustion chamber. Thus, as indicated above, it has been concluded that the volume, per se, of the auxiliary combustion chamber is a less important variable than the interacting variables comprising the subject matter of the invention. There will, of course, be practical minimum and maximum values for the volume of the auxiliary combustion chamber. For example, as will be understood by those skilled in the art, the minimum volume would be reached when there was an insufficient volume of burning gas to create an effective jet of burning gas for igniting the fuel-lean mixture in the main combustion chamber. The maximum volume would be reached when the volume of the auxiliary chamber adversely affects the compression ratio of the engine more than can be mechanically compensated for.

Each of said combustion chambers 12 and 14 has a separate carburetor 16 and 18, respectively, connected in fluid communication therewith. Said carburetors are in turn connected in any suitable known manner to an air supply, a fuel supply, and a throttle (on carburetor 16) for discharging fuel-air mixtures from said carburetors 16 and 18 into their respective combustion chambers 12 and 14.

The carburetor 16 of the main combustion chamber is constructed to receive and mix fuel and air therein and discharge a fuel-air mixture into said main combustion chamber 12 which is a relatively lean fuel-air mixture, usually being less than about 80 percent stoichiometric fuel. For example, when operating at high manifold pressures, the mixture would contain in the order of 50 percent or less of the stoichiometric amount of fuel; and when operating at low manifold pressures, the mixture would contain in the order of 80 percent or less of the stoichiometric amount of fuel.

The carburetor 18 of the auxiliary combustion chamber is constructed to receive and mix fuel and air therein and discharge a fuel-air mixture into said auxiliary combustion chamber which is a richer mixture relative to said other fuel mixture, e.g., a fuel-air mixture having a fuel content in the range of about 200 to about 1100 percent of the stoichiometric amount of fuel.

A spark ignition system, referred to generally by the reference numeral 20 (see FIG. 2), is associated with said auxiliary combustion chamber 14 for igniting the fuel-air mixture therein, the flame from which jets through orifice 15 and in turn ignites the fuel-air mixture in the main combustion chamber 12 for operating the engine. In the auxiliary combustion chambers studied in the test runs described hereinafter said orifice 15 had a diameter of one-eighth inch and was provided with a square shoulder. However, the invention is not limited to such an orifice. Any suitable orifice can be employed in the practice of the invention. As a practical matter, it has been observed that the diameter or cross-sectional area of the auxiliary chamber should not be greater than about 8 times the diameter or cross-sectional area of the orifice. Preferably, the diameter or cross-sectional area of the auxiliary chamber will be in the range of from about 4 to 6 times the diameter or cross-sectional area of the orifice.

An exhaust conduit 22 (see FIG. 1) is connected to the exhaust outlet of the main combustion chamber 12 for directing the exhaust gases resulting from the combustion of the fuel-air mixtures in said auxiliary and said main combustion chambers.

Based on the data obtained in connection with the test runs described hereinafter, it was concluded that the invention is applicable to auxiliary combustion chambers having L/D ratios within the range of from 1 to at least about 9. Preferably, said L/D ratios will be in the range of from 1 to 6. When employing cylindrical auxiliary chambers, a more preferred range for the L/D ratio is from 3 to 6. Cylindrical auxiliary combustion chambers are frequently preferred because of practical considerations in design, fabrication, and installation.

It has also been concluded that the spark-gap location should be located at a predetermined location in the rearward 50 percent (F/E = 1) of the auxiliary combustion chamber, as measured from the orifice, frequently in the rearward 43 percent (F/E = 0.75), and predetermined relative to said L/D ratio. When cylindrical auxiliary chambers having a L/D ratio within the range of from 3 to 6 are employed it is usually preferred that the spark-gap be located in the rearward 38 percent (F/E = 0.61) of the chamber, and more preferably excluding the most rearward 13 percent (F/E = 0.15) of the chamber. In all instances it is preferred that the spark-gap be located at least a small finite distance from the wall of the chamber, e.g., about 2 percent of the distance from the orifice to said rear wall. This is to provide better "circulation" of the fuel mixture around the spark-gap.

It has also been concluded that the volume flow (P) of the fuel-rich mixture to the auxiliary combustion chamber should be at least about 125 percent of the volume of said chamber, e.g., from about 125 to about 300 percent for auxiliary chambers having an L/D in the range of 1 to about 9. Usually, said volume flow (P) will preferably be in the range of from about 175 to about 300 percent of the volume of the chamber when auxiliary chambers having a L/D ratio within the range of from 1 to 6 are employed. When cylindrical auxiliary chambers having a L/D ratio within the range of from 3 to 6 are employed, it is usually more preferred that said volume flow (P) be within the range of from about 175 to about 250 percent of the volume of the chamber. Said volume flow (P) is predetermined relative to said L/D ratio.

It has also been further concluded that the fuel content (PCSF) of the fuel-rich mixture introduced into the auxiliary combustion chamber should be at least about 200 percent of stoichiometric, i.e., the percentage ratio of the fuel present to the fuel required for a stoichiometric mixture, e.g., from about 200 to about 1100 for auxiliary chambers having an L/D in the range of 1 to about 9. Usually, said fuel content (PCSF) will preferably be in the range of from about 300 to about 1100 percent of stoichiometric when chambers having a L/D ratio within the range of from 1 to 6 are employed. When cylindrical auxiliary chambers having a L/D ratio within the range of from 3 to 6 are employed, it is usually more preferred that said fuel content (PCSF) be within the range of from about 300 to 750 percent of stoichiometric. Said fuel content (PCSF) is predetermined relative to said L/D ratio.

The following examples will serve to further illustrate the invention.

EXAMPLES

Figure 3:
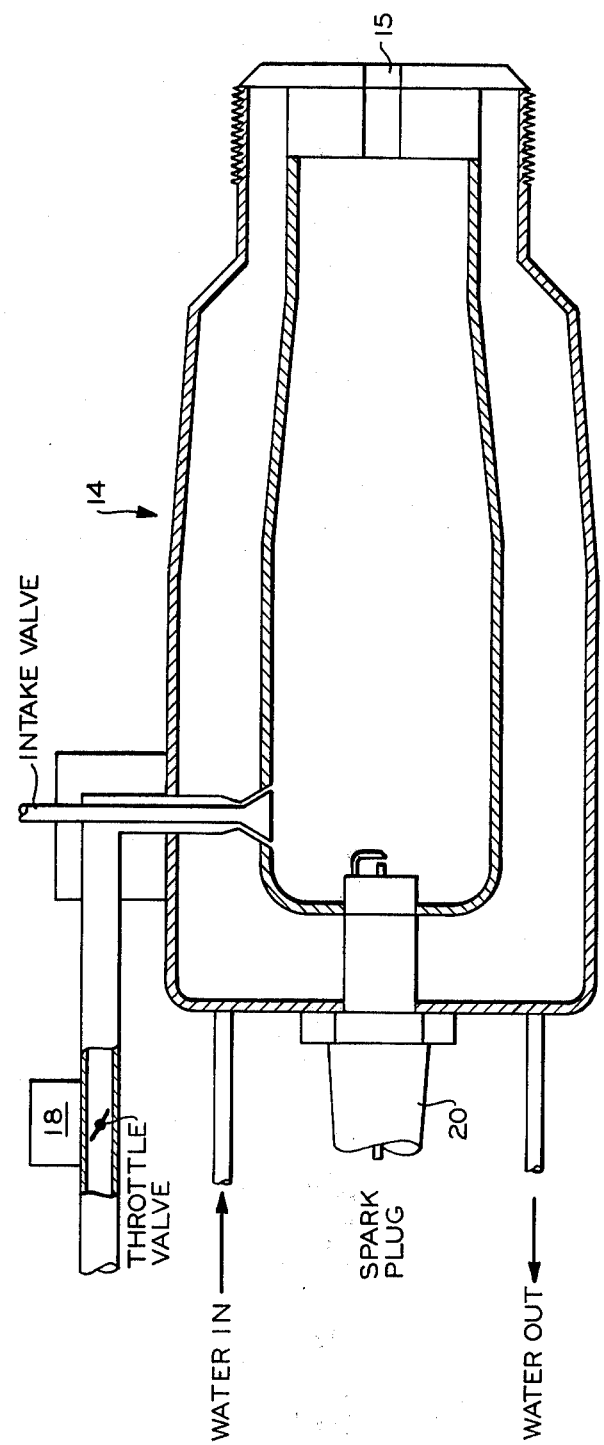
FIG. 3 is a diagrammatic view, partly in cross section, illustrating the general configuration of the auxiliary combustion chambers employed in the test runs described herein.
Figure 4:
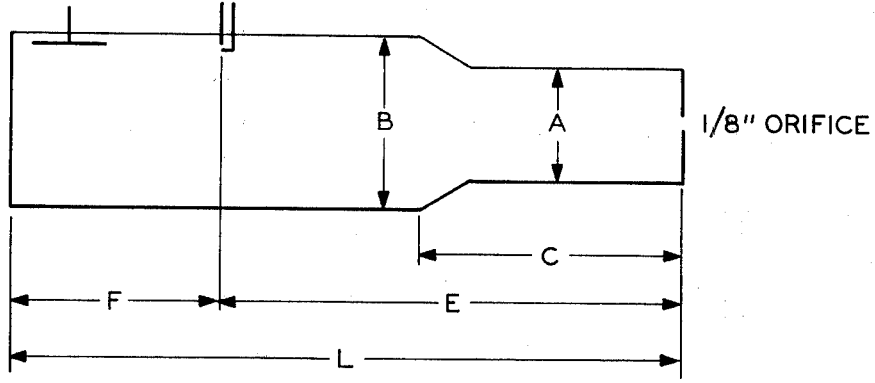
FIG. 4 is a diagrammatic illustration, and tabulation, of the design characteristics of the auxiliary combustion chambers employed in the test runs described herein.

A series of test runs was carried out employing the twelve configurations of auxiliary combustion chambers set forth in FIG. 4. Referring to FIG. 3, in auxiliary chambers 1-A, 1-B, and 1-C the spark plug extended through the rear wall of the chamber as there indicated. In the other chambers the spark plug extended through the side wall of the chamber as in FIG. 4. In said test runs, except where otherwise stated, the following general procedure was followed when employing each of said twelve configurations of auxiliary combustion chambers on the engine of FIG. 1.

The auxiliary combustion chambers employed in said test runs were designed to be inserted in, and removed from, the spark plug hole of an essentially conventional CFR laboratory knock-test engine. Since this arrangement did not disturb the standard configuration, direct comparisons with the standard engine could be made easily. Although not shown in FIG. 1, the intake valve of the auxiliary combustion chamber was equipped with a rocker-arm assembly which was actuated by the intake push-rod of the engine in synchronization with the engine intake valve. The fuel-rich fuel-air mixture was inducted through the auxiliary combustion chamber intake valve at a rate of about 2 percent of the flow of the fuel-lean fuel-air mixture into the main combustion chamber. A mixing tank was provided upstream of the auxiliary combustion chamber intake valve to aid in the fuel vaporization and fuel-air mixing processes. The driving force to transfer the fuel-air mixture into the auxiliary combustion chamber was provided by the suction created during the intake stroke of the engine. Fuel for the auxiliary combustion chamber was metered to said mixing tank from a nitrogen pressurized reservoir, and air was supplied from a compressed-air cylinder. Said mixing tank was always operated at atmospheric pressure or below.

The engine, except for the presence of two additional transducer access holes was substantially the same mechanically as the CFR knock-test unit specified in "ASTM Manual For Rating Motor, Diesel, and Aviation Fuels", pages 140-141, American Society For Testing Materials, Philadelphia, Pa., 1971. Said engine was provided with a shrouded intake valve. However, the invention is not limited to engines provided with shrouded intake valves. Speed control and power absorption were provided by a DC dynamometer. Air flow was controlled with a throttle valve located just downstream from a fuel and air mixing tank and was measured with an Alcock viscous-flow air meter. Fuel was atomized into said mixing tank from the same pressurized reservoir used for the auxiliary combustion chamber and was measured by noting the time required to consume a known volume. The air entering said mixing tank was maintained at 175° F. by automatically controlled heaters. The final mixture temperature at the intake port was controlled to 125° F. by a second set of heaters located just downstream of the throttle valve. Coolant temperature was controlled to 149° F. by refluxing methanol in the engine jacket. Spark timing could be varied and measured through 360° of crank rotation with a breaker-point and synchronous neon-lamp flasher assembly similar to that specified in said ASTM manual.

The fuel used in said test runs in both the auxiliary combustion chamber and the main combustion chamber was a premium grade, full boiling range, gasoline containing 2.5 ml TEL (tetraethyl lead) per gallon.

Power was measured in terms of indicated mean effective pressure (IMEP) by means of a specially designed analog computer to integrate the signal from a strain-gauge pressure transducer. The computer yielded a d.c. millivolt signal exactly proportional to the difference between the compression pressure-time integral and the expansion pressure-time integral. The output was displayed on a millivolt strip-chart recorder to yield a continuous (and instantaneous) IMEP readout. Calibration of the IMEP measurement system was accomplished by loading the transducer with known static pressures and by comparing system measurements to manually integrated indicator diagrams. The agreement between computer and manual IMEP's was always within 3 percent.

Misfires were detected by monitoring the output of the IMEP computer with an oscilloscope on a cycle-by-cycle basis. Any cycle showing negligible IMEP was counted as a misfire. Exhaust hydrocarbon values also aided in determining misfire in cases where complete misfire did not occur but engine operation was unacceptable.

The operating parameters of the test engine during said test runs were fixed at the following values:
1000 RPM
7.0 compression ratio
90 percent throttle (0.9 atmospheres intake pressure)
Maximum power spark timing
125° F. inlet mixture temperature
149° F. coolant temperature During said test runs each auxiliary combustion chamber configuration set forth in FIG. 4 was evaluated at several fixed levels of auxiliary chamber fuel-rich, fuel-air mixture flows thereto, expressed as percentage of auxiliary chamber volume filled with said mixture at bottom dead center, and at several fixed levels of fuel content in said mixture, expressed as the percentage ratio of the fuel present to the fuel required for a stoichiometric mixture. During each said test run, the main combustion chamber was supplied with a relatively fuel-lean, fuel-air mixture, with the fuel content of said lean mixture being varied to determine the overall lean misfire limit. The lean misfire limit, expressed as an overall percentage of stoichiometric fuel, was the criterion of the evaluations.

The lean misfire limit (LMFL) expresses the lean limit of operation for an engine. When applied to an engine provided with an auxiliary combustion chamber it is normally expressed in terms of the overall or total amount of fuel supplied to the engine, e.g., both the main combustion chamber and the auxiliary combustion chamber. Thus, herein and in the claims, unless otherwise specified, the lean misfire limit is defined as the overall percent of stoichiometric fuel (based on total air and total fuel flow to the engine) at which unstable combustion occurs in the main combustion chamber, e.g., combustion does not occur consistently on each engine cycle. The method of the invention makes it possible to extend the minimum lean misfire limit to lower minimum values than heretofore possible; and in the practice of the invention the engine is operated to approach said extended minimum lean misfire limit. The expression "percent of stoichiometric" refers to the percentage ratio of fuel present to the fuel required for a stoichiometric mixture.

The raw data from said test runs were subjected to a statistical correlation analysis. From this analysis it was concluded that the effect of the volume per se of the auxiliary combustion chamber on the lean misfire limit was much less important than the effect of the L/D ratio. It was further concluded that said L/D ratio, the spark gap location, the percentage volume of the auxiliary chamber filled with auxiliary chamber mixture, and the percentage of stoichiometric fuel present in the auxiliary chamber mixture were much more important variables because it definitely appeared that all four of said variables interacted with each other in producing the observed lean misfire limits obtained during said test runs.

Said raw data were then subjected to regression analysis. From this analysis, and back calculations over the range of actual observed data, it was possible to determine the minimum lean misfire limit for a given L/D ratio, and the values for the spark-gap location, the volume percent of the auxiliary chamber filled with the fuel-rich mixture, and the percent of stoichiometric fuel in said mixture, which produced said minimum lean misfire limit. The results of this analysis are set forth in the following Table I.

TABLE I

MINIMUM LEAN MISFIRE LIMITS FOR VARIOUS VALUES OF L/D

| L/D | $P^{(1)}$ | $F/E^{(2)}$ | $PCSF^{(3)}$ | Min. $LMFL^{(4)}$ |
|---|---|---|---|---|
| 3.80 | 218 | 0.40 | 600 | 39.8 |
| 5.72 | 178 | 0.14 | 310 | 52.2 |
| 6.63 | 160 | 0.20 | 200 | 54.0 |
| 7.28 | 155 | 0.33 | 200 | 55.6 |
| 8.89 | $124^{(5)}$ | $0.75^{(5)}$ | 200 | $61.5^{(5)}$ |

Corresponding Calculated Values of:

$^{(1)}$Auxiliary chamber mixture flow (% of auxiliary chamber volume filled at bottom dead center).
$^{(2)}$Spark-gap location (see FIG. 4)
$^{(3)}$Auxiliary chamber mixture stoichiometry (% of stoichiometric)
$^{(4)}$Minimum lean misfire limit (overall)
$^{(5)}$Values of P and F/E limited by data space; values of LMFL may not be the true minimum.

The data set forth in the above Table I shows that as the L/D ratio was decreased (the chamber shortened), the minimum lean misfire limit also decreased. A volume flow (P) of auxiliary chamber rich-mixture flow that would overfill the chamber was required for the minimum lean misfire limit at all L/D ratios, with a greater excess being required as the chamber was made shorter. The spark-gap location was always in the rearward 50 percent of the chamber, as measured from the orifice, at the minimum lean misfire limit. The fuel content of the fuel-rich mixture to the auxiliary chamber (at minimum lean misfire limit) increased as the chamber was decreased in length (decreasing L/D ratio).

The results set forth in the above Table I were checked against the raw data by plotting the lowest lean misfire limit actually observed with each auxiliary combustion chamber against the L/D ratio for the auxiliary chamber. Auxiliary chamber No. 2 was excluded from this plot since it involved only one spark-gap location. The results are shown in FIG. 5.

Figure 5:
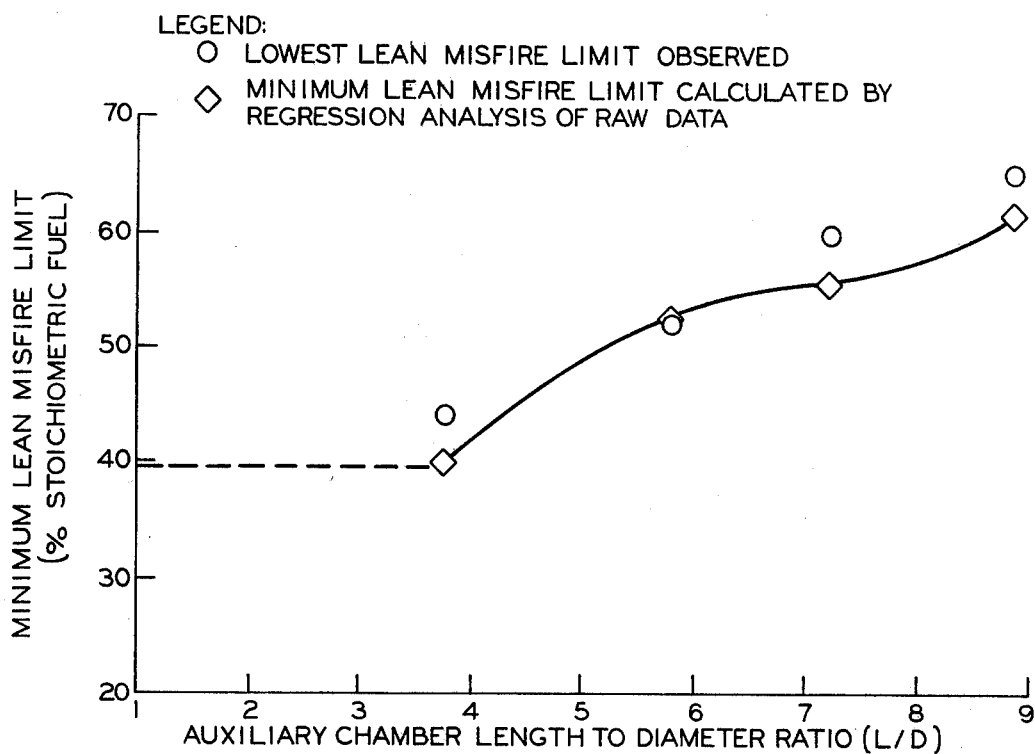

It was concluded that said FIG. 5 shows a remarkable check or correlation between the lowest LMFL actually observed and the minimum LMFL determined by said regression analysis when both sets of LMFL values are plotted against L/D ratio.

Figure 6:
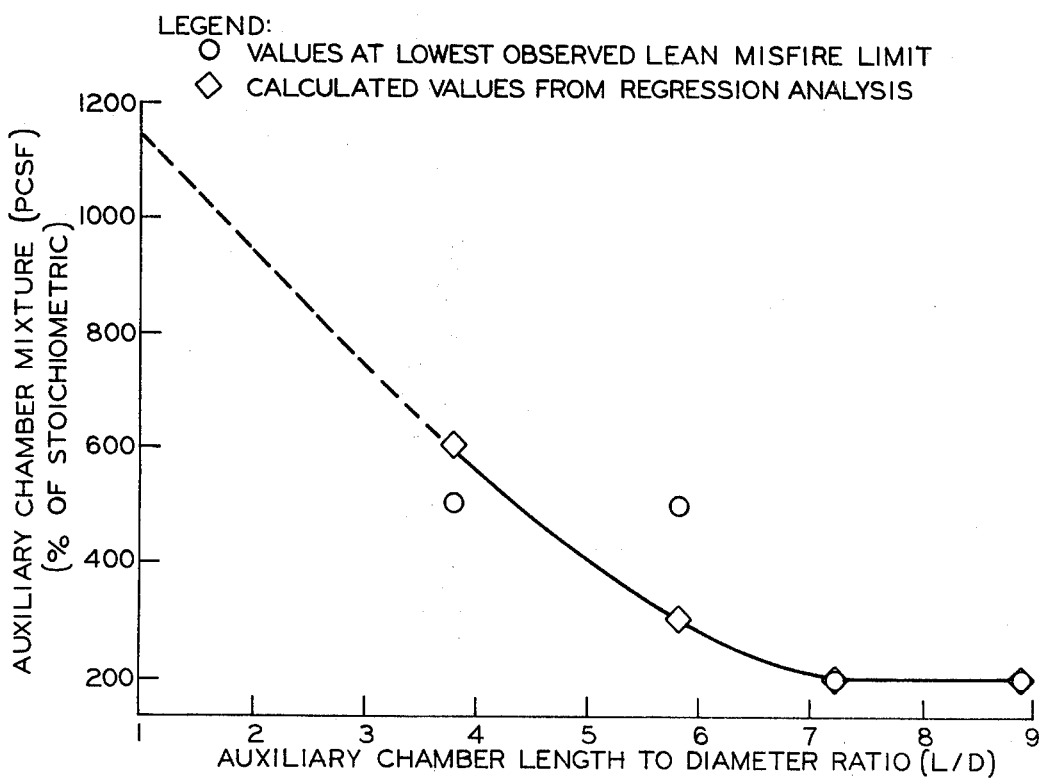
Figure 7:
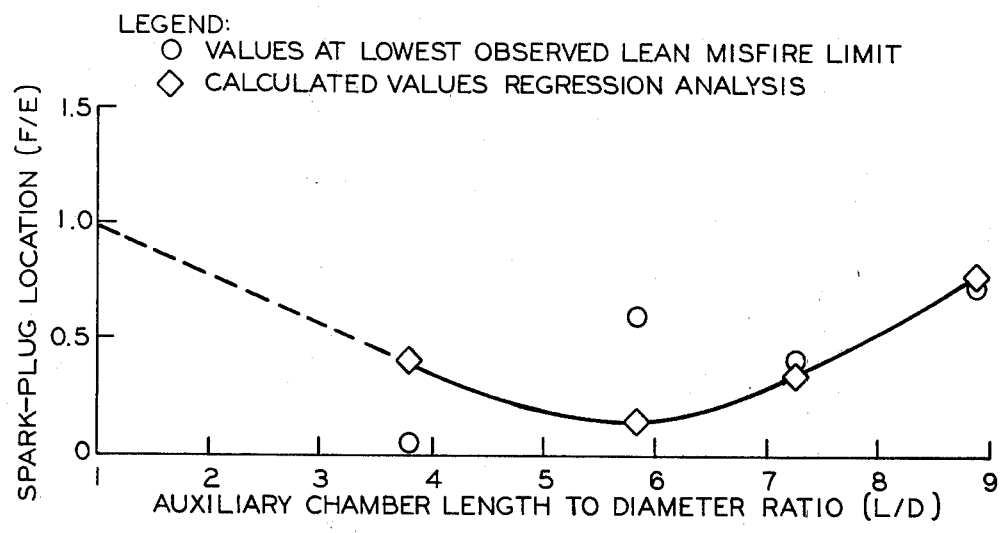
Figure 8:
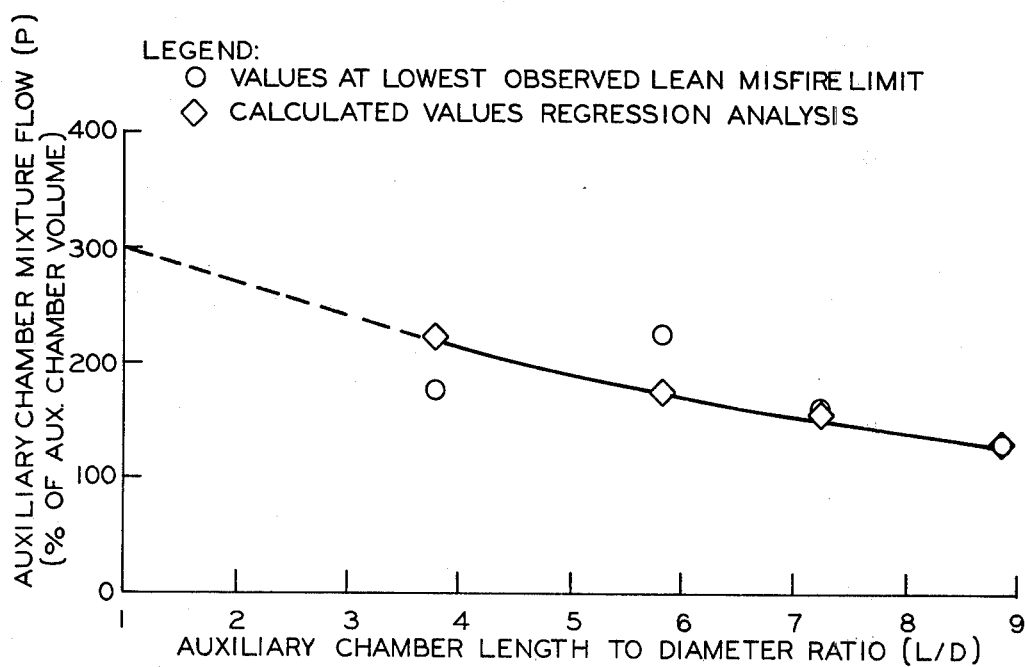

FIGS. 6, 7, and 8 set forth further checks on the above described regression analysis of the raw data. In said FIGS. 6, 7, and 8 the values for each of, the percentage volume (P) of auxiliary chamber filled with fuel-rich mixture, the spark-gap location (F/E), and the percent of stoichiometric fuel (PCSF) in said fuel-rich mixture, at minimum LMFL as derived from said regression analysis, are compared with the values for each of said parameters at which the lowest LMFL was actually observed, by plotting both of said sets of LMFL values against L/D ratio.

From said FIGS. 6, 7, and 8 it was concluded that the only significant discrepancies between the calculated values and the observed values for said parameters occurred at low values of L/D with the parameters of spark-gap location and percentage of stoichiometric fuel in the fuel-rich mixture fed to the auxiliary combustion chamber. Since both of said last-mentioned parameters were widely spaced in the test run program due to mechanical and/or time limitations, it was concluded that the correlation between said calculated values and said observed values was reasonable.

From said FIGS. 5, 6, 7, and 8 it was further concluded that there definitely was an interaction between the variables L/D, volume percent of auxiliary chamber filled with fuel-rich mixture, percent of stoichiometric fuel in said fuel-rich mixture, and spark-gap location in producing the observed LMFLs obtained.

Referring again to FIG. 5, the mechanical arrangement of the CFR engine employed in the test runs prevented extending the study to include auxiliary combustion chambers shorter than those studied. However, from a consideration of the data as a whole (both calculated and observed data), it was concluded that the minimum LMFL of about 40 percent stoichiometric fuel (overall) must be approaching the ultimate limit of lean operation when using hydrocarbon fuels. This conclusion is supported by the facts that at 40 percent stoichiometric fuel the equilibrium flame temperature is 2420° R, the mol fraction of hydrogen atoms in the burned gas (at equilibrium) is less than $10^{-10}$, the mol fraction of oxygen atoms is in the range of $10^{-8}$, and the mol fraction of hydroxyl radicals is in the order of $10^{-6}$. From the low flame temperature and the scarcity of active radicals, one would not expect a hydrocarbon flame to propagate at 40 percent stoichiometric fuel. This is the basis for the substantially straight line extrapolation of FIG. 5.

However, the situation is different with other fuels such as hydrogen, alcohols, ethers, esters, etc., used alone or in admixtures thereof with hydrocarbons. Thus, in the practice of the invention with other fuels having different equilibrium flame temperatures, and producing different equilibrium concentrations of active radicals, one would expect lower LMFL values when operating in accordance with the invention. Thus, the invention is not limited to the use of hydrocarbon fuels and/or the LMFL of about 40 percent stoichiometric fuel obtained therewith.

The invention has been illustrated herein with data obtained when employing cylindrical auxiliary combustion chambers and when using a hydrocarbon fuel. As indicated above, it can be concluded from said data that when using a hydrocarbon fuel with a cylindrical auxiliary combustion chamber there is not much to be gained by employing an auxiliary combustion chamber having a L/D ratio of less than about 3.8 because about 40 percent stoichiometric fuel is the minimum LMFL which can be obtained with hydrocarbon fuels. However, the invention is not limited to using either hydrocarbon fuels, or cylindrical auxiliary combustion chambers. It is within the scope of the invention to use fuels other than essentially pure hydrocarbon fuels. It is also within the scope of the invention to employ auxiliary combustion chambers having a shape other than cylindrical, e.g., spherical which would have a L/D ratio of 1. Thus, the operating ranges for the independent parameters of the invention method have been established accordingly.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A method for operating an internal combustion spark ignition engine at substantially minimum lean misfire limit LMFL wherein said engine comprises at least one cylinder and a reciprocating piston therein defining a main combustion chamber, a cylindrical shaped auxiliary combustion chamber associated with said main combustion chamber, an orifice positioned in the forward end of said cylindrical shaped combustion chamber and providing communication between said main combustion chamber and said cylindrical shaped auxiliary combustion chamber, and spark ignition means positioned in the rearward 50 percent of said cylindrical shaped auxiliary combustion chamber as measured from said orifice providing an initial ignition point to effect ignition of a fuel-air mixture in said cylindrical shaped auxiliary combustion chamber, said method comprising, in combination:

providing said main combustion chamber with said cylindrical shaped auxiliary combustion chamber wherein said cylindrical shaped auxiliary combustion chamber is defined as having a predetermined length over diameter ratio L/D within the range of 1 to about 9;

introducing a fuel-rich mixture of fuel and air having a fuel content of at least about 200 percent of stoichiometric PCSF into said cylindrical shaped auxiliary combustion chamber as said fuel-air mixture therein in an amount P which is at least about 125 volume percent of the volume of said cylindrical shaped auxiliary combustion chamber, with said fuel content and said amount of said fuel-rich mixture both being predetermined relative to said length over diameter ratio;

introducing a fuel-lean mixture of fuel and air into said main combustion chamber; and igniting said fuel-rich mixture at said initial ignition point located as predetermined relative to said length over diameter L/D ratio, thereby effecting ignition of said fuel-lean mixture in said main combustion chamber via said orifice; and selecting said L/D ratio, said PCSF, said initial ignition point location, and said amount P, in combination substantially in accordance with the relationship limits defined by the curves of FIGS. 5, 6, 7, and 8, the selection being effective in combination to operate said engine at said substantially LMFL.

2. A method according to claim 1 wherein said fuel-rich mixture has a fuel content within the range of about 200 to about 1100 percent of stoichiometric.

3. A method according to claim 1 wherein said fuel-rich mixture PCSF is introduced into said cylindrical shaped auxiliary combustion chamber in an amount P within the range of about 125 to about 300 percent of the volume of said chamber.

4. A method according to claim 1 wherein said initial ignition point is located in the rearward 43 percent of said cylindrical shaped auxiliary combustion chamber.

5. A method according to claim 1 wherein:

said fuel-rich mixture PCSF has a fuel content within the range of about 200 to about 1100 percent of stoichiometric;

said fuel-rich mixture PCSF is introduced into said cylindrical shaped auxiliary combustion chamber in an amount P within the range of about 125 to about 300 percent of the volume of said chamber; and said initial ignition point is located in the rearward 43 percent of said cylindrical shaped auxiliary combustion chamber.

6. A method according to claim 1 wherein said cylindrical shaped auxiliary combustion chamber has a predetermined length to diameter L/D ratio within the range of 1 to 6.

7. A method according to claim 6 wherein said fuel-rich mixture PCSF has a fuel content within the range of about 300 to about 1100 percent of stoichiometric.

8. A method according to claim 6 wherein said fuel-rich mixture PCSF is introduced into said cylindrical shaped auxiliary combustion chamber in an amount P within the range of about 175 to about 300 percent of the volume of said auxiliary combustion chamber.

9. A method according to claim 6 wherein said initial ignition point is located in the rearward 43 percent of said cylindrical shaped auxiliary combustion chamber.

10. A method according to claim 6 wherein:

said fuel-rich mixture PCSF has a fuel content within the range of about 300 to about 1100 percent of stoichiometric;

said fuel-rich mixture is introduced into said cylindrical shaped auxiliary combustion chamber in an amount within the range of about 175 to about 300 percent of the volume of said cylindrical shaped auxiliary combustion chamber; and said initial ignition point is located in the rearward 38 percent of said cylindrical shaped auxiliary combustion chamber.

11. A method according to claim 1 wherein:

said fuel is a hydrocarbon fuel; and said cylindrical shaped auxiliary combustion chamber has a predetermined length to diameter L/D ratio within the range of 3 to 6.

12. A method according to claim 11 wherein said fuel-rich mixture PCSF has a fuel content within the range of about 300 to about 750 percent of stoichiometric.

13. A method according to claim 11 wherein said fuel-rich mixture PCSF is introduced into said cylindrical shaped auxiliary combustion chamber in an amount P within the range of about 175 to about 250 percent of the volume of said cylindrical shaped auxiliary combustion chamber.

14. A method according to claim 11 wherein said initial ignition point is located in the rearward 38 percent of said cylindrical shaped auxiliary combustion chamber.

15. A method according to claim 11 wherein:

said fuel-rich mixture has a fuel content within the range of about 300 to about 750 percent of stoichiometric;

said fuel-rich mixture is introduced into said cylindrical shaped auxiliary combustion chamber in an amount within the range of about 175 to about 250 percent of the volume of said cylindrical shaped auxiliary combustion chamber; and said initial ignitio point is located in the rearward 38 percent of said cylindricl shaped auxiliary combustion chamber.

16. A method for operating an internal combustion spark ignition engine at substantially minimum lean misfire limit LMFL wherein said engine comprises at least one cylinder with a reciprocating piston therein defining a main combustion chamber, a cylindrical shaped auxiliary combustion chamber associated with said main combustion chamber and in open communication therewith by means of an orifice positioned in the forward end of said cylindrical shaped combustion chamber and providing said communication between said main combustion chamber and said cylindrical shaped auxiliary combustion chamber, and spark ignition means positioned in the rearward 50 percent of said cylindrical shaped auxiliary combustion chamber as measured from said orifice providing an initial ignition point to effect ignition of a fuel-air mixture in said cylindrical shaped auxiliary combustion chamber, said method comprising, in combination:

providing said main combustion chamber with said cylindrical shaped auxiliary combustion chamber wherein said cylindrical shaped auxiliary combustion chamber is defined as having a predetermined length over diameter ratio L/D within the range of 1 to about 9;

introducing a fuel-rich mixture of fuel and air having a fuel content of at least about 200 percent of stoichiometric PCSF into said cylindrical shaped auxiliary combustion chamber as said fuel-air mixture therein in an amount P which is at least about 125 volume percent of the volume of said cylindrical shaped auxiliary combustion chamber, with said fuel content and said amount of said fuel-rich mixture both being predetermined relative to said length over diameter ratio;

introducing a fuel-lean mixture of fuel and air into said main combustion chamber; and igniting said fuel-rich mixture at said initial ignition point located as predetermined relative to said length over diameter L/D ratio, thereby effecting ignition of said fuel-lean mixture in said main combustion chamber via said orifice; wherein said L/D ratio, said PCSF, said initial ignition point, and said amount P, are controlled in combination substantially in accordance with the relationship limits defined by the curves of FIGS. 5, 6, 7, and 8, thereby operating said engine at said substantially LMFL with minimal emissions of pollutants.

* * * * *